United States Patent
Sukhov et al.

(10) Patent No.: US 12,333,791 B2
(45) Date of Patent: Jun. 17, 2025

(54) DETERMINING MEDIA DOCUMENTS EMBEDDED IN OTHER MEDIA DOCUMENTS

(71) Applicant: Microsoft Technology Licensing, LLC, Redmond, WA (US)

(72) Inventors: Pavel Sukhov, Olso (NO); Thomas Peter Kunert, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 328 days.

(21) Appl. No.: 17/890,769

(22) Filed: Aug. 18, 2022

(65) Prior Publication Data
US 2024/0062529 A1  Feb. 22, 2024

(51) Int. Cl.
*G06V 10/774* (2022.01)
*G06V 10/74* (2022.01)
(Continued)

(52) U.S. Cl.
CPC ........ *G06V 10/7747* (2022.01); *G06V 10/761* (2022.01); *G06V 10/7796* (2022.01);
(Continued)

(58) Field of Classification Search
CPC .. G06V 10/7747; G06V 20/46; G06V 10/761; G06V 10/7796; G06V 10/82; G06V 20/41
(Continued)

(56) References Cited

U.S. PATENT DOCUMENTS 7,099,798 B2   8/2006  Yu et al.
9,357,098 B2   5/2016  Graham et al.
(Continued)

FOREIGN PATENT DOCUMENTS

CN   103699691 B   9/2017

OTHER PUBLICATIONS

"Scikit-Learn", Retrieved from: https://scikit-learn.org/stable/, Retrieved Date: Jun. 27, 2022, 2 Pages.
(Continued)

*Primary Examiner* — Michael R Neff
(74) *Attorney, Agent, or Firm* — Novo TechIP International PLLC

(57) ABSTRACT

The disclosed technology is generally directed to identifying media documents embedded within other media documents. In one example of the technology, source fingerprints are generated from input images using a source machine-learning model. The input images are derived from the media documents. Target fingerprints are generated from the input images using a target machine-learning model. The source machine-learning model includes a first neural network. The target machine-learning model includes a second neural network that is different from the first neural network. The source machine-learning model was trained in parallel with the target machine-learning model. Candidate media-document pairs from the media documents are determined based on the source fingerprints and the target fingerprints. Each candidate media-document pair includes a media document that is a candidate for being embedded in another media document.

17 Claims, 5 Drawing Sheets

(51) Int. Cl.
*G06V 10/778* (2022.01)
*G06V 10/82* (2022.01)
*G06V 20/40* (2022.01)

(52) U.S. Cl.
CPC .............. *G06V 10/82* (2022.01); *G06V 20/41* (2022.01); *G06V 20/46* (2022.01)

(58) Field of Classification Search
USPC ........................................................ 382/157
See application file for complete search history.

(56) References Cited

U.S. PATENT DOCUMENTS

| | | | |
|---|---|---|---|
| 10,586,111 | B2 | 3/2020 | Pavetic et al. |
| 11,417,099 | B1* | 8/2022 | Hillman Beauchesne ................. G06V 40/172 |
| 2020/0320356 | A1* | 10/2020 | Butt ..................... G06V 10/454 |
| 2021/0118136 | A1* | 4/2021 | Hassan-Shafique ... G16B 20/20 |
| 2021/0279517 | A1 | 9/2021 | Arik et al. |
| 2021/0281742 | A1 | 9/2021 | Piccoli et al. |
| 2021/0314635 | A1 | 10/2021 | Kim et al. |
| 2022/0004754 | A1 | 1/2022 | Huang |
| 2023/0334842 | A1* | 10/2023 | Zhu ...................... G06V 10/774 |

OTHER PUBLICATIONS

"Vector Database Built for Scalable Similarity Search", Retrieved from: https://milvus.io/, Retrieved Date: Jun. 27, 2022, 4 Pages.

Dixit, et al., "Fingerprint-Based Document Image Retrieval", In International Journal of Image and Graphics, vol. 19, Issue 2, Apr. 24, 2019, 17 Pages.

"International Search Report and Written Opinion Issued in PCT Application No. PCT/US23/027756", Mailed Date: Oct. 19, 2023, 15 Pages.

Wiggers, et al., "Deep Learning Approaches for Image Retrieval and Pattern Spotting in Ancient Documents", In repository of arXiv:1907.09404v1, Jul. 22, 2019, pp. 1-10.

* cited by examiner

DETERMINING MEDIA DOCUMENTS EMBEDDED IN OTHER MEDIA DOCUMENTS

BACKGROUND

A machine-learning (ML) algorithm may be used to build a model based on training data so that the model can perform a particular objective. Supervised learning algorithms typically build a mathematical model of a set of training data that contains both the inputs and the desired outputs. The training data typically consists of a set of training examples. Each training example typically has one or more inputs and the desired output. Through iterative optimization of an objective function, supervised learning algorithms typically learn a function that can be used to predict the output associated with new inputs. An optimal function will typically allow the algorithm to correctly determine the output for inputs that were not a part of the training data.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to identifying media documents embedded within other media documents, as follows according to some examples. Source input images that are derived from a set of source media documents are obtained. Target input images that are derived from a set of target media documents are obtained. Source fingerprints from the source input images are generated using a source ML model. Target fingerprints from the target input images are generated using a target ML model. The source ML model includes a first neural network. The target ML model includes a second neural network that is different from the first neural network. The source ML model was trained in parallel with the target ML model such that the source ML model outputs a source fingerprint from a source input image and the target ML model outputs a target fingerprint from a target input image with a training objective that: a distance between the source fingerprint and the target fingerprint is less than a first threshold if the source input image is embedded within the target input image, and the distance between the source fingerprint and the target fingerprint is greater than the first threshold if the source image is absent from the target input image. The source fingerprints and the target fingerprints are used to determine a set of candidate media-document pairs. Each candidate media-document pair of the set of candidate media-document pairs includes a candidate source media document from the source media documents and a candidate target media document from the target media documents such that the candidate source media document is a candidate for being embedded in the candidate target media document.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings, in which.

DETAILED DESCRIPTION

The disclosed technology is generally directed to identifying media documents that are embedded within other media documents. The term "media document" may refer to any kind of document, video, or the like that can be viewed. In essence, a "media document" is any document, video, or the like that can be converted into images. For example, a user may be looking at a video recording of a meeting and may want to see a slide of a presentation that was presented during the video.

Some examples may operate as follows. Media documents to be analyzed may be input to a system. For instance, the media documents may include target media documents, such as videos in which documents may be presented, and source media documents, such as slide presentations that may appear in a video. For media documents that are to be identified in this way, images are extracted from each of the media documents. For examples, the extracted images may include individual slides from a slide presentation, video frames from a video, or the like.

After extracting the images, fingerprints may be generated as follows in some examples. Source fingerprints are generated from the source media documents, and target fingerprints are generated from the target media documents. Each fingerprint is a vector of floating-point numbers. A source ML model is used to generate the source fingerprints from the source media documents, and a target ML model is used to generate the target fingerprints from the target media documents.

The source ML model and the target ML model each have a separate neural network, but the source ML model and the target ML model are trained in parallel. The two ML models are trained in parallel so that the distance between the source fingerprint and target fingerprint is a below a particular threshold if the source image is embedded within the target image, and above the particular threshold otherwise. If the distance between the source fingerprint and target fingerprint is a below the particular threshold the fingerprints are said to be similar.

After generating the fingerprints, some examples may operate as follows. A nearest neighbor algorithm is used to efficiently find similar fingerprints. For fingerprints that are similar, the corresponding source input image is a candidate for being embedded in the corresponding target input image, meaning that the corresponding source media document from which the source document was extracted is a candidate for being embedded in the corresponding target media document. In some examples, a confirmation ML model is used to confirm, for each of the candidates, whether the source input image is embedded in the target input image.

Illustrative Systems

Figure 1:
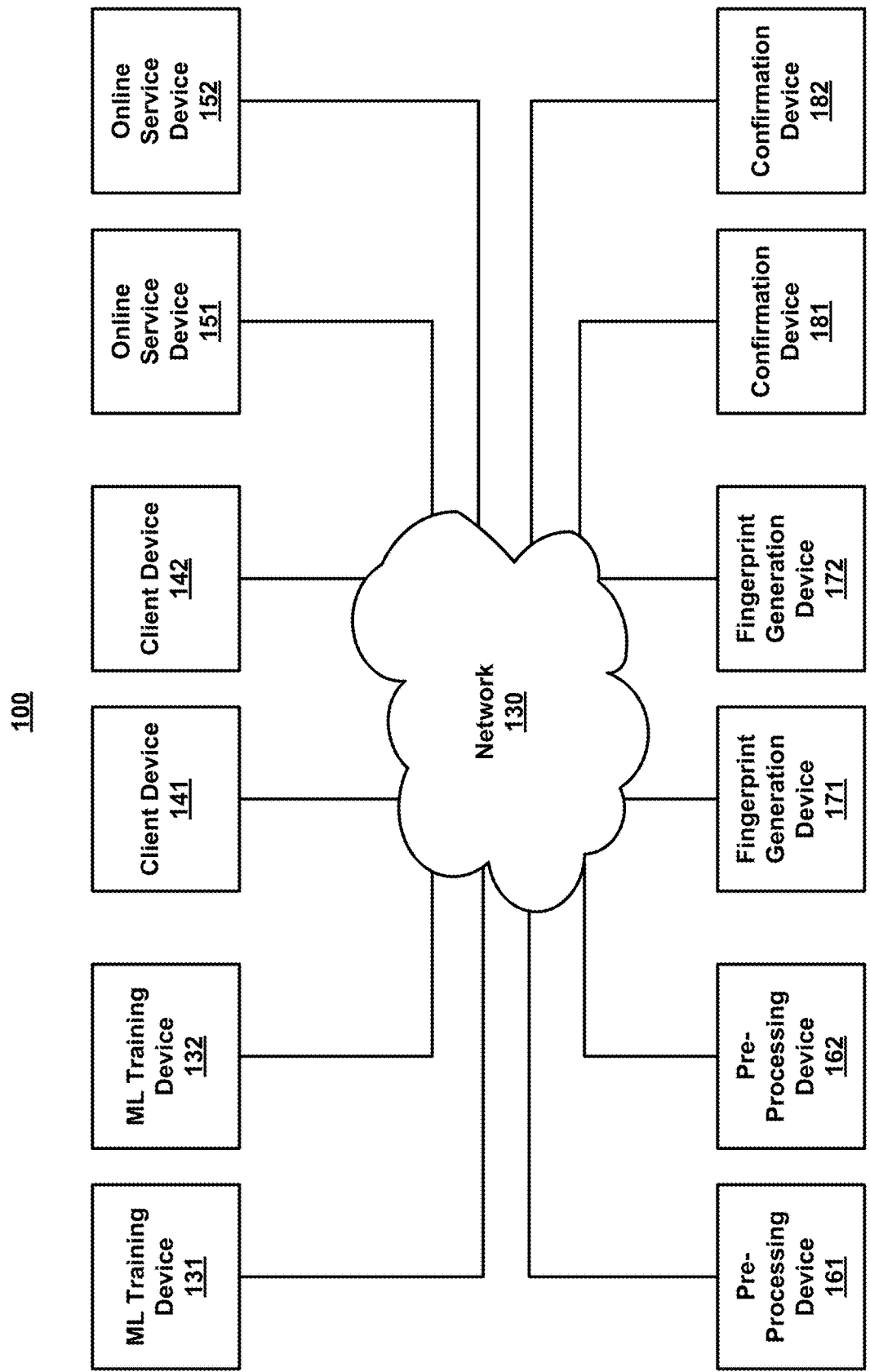
FIG. 1 is a block diagram illustrating an example of a network-connected system.

FIG. 1 is a block diagram illustrating an example of a system (100). FIG. 1 and the corresponding description of FIG. 1 in the specification illustrate an example system for illustrative purposes that does not limit the scope of the disclosure. System 100 includes network 130, as well as client devices 141 and 142, online service devices 151 and 152, pre-processing devices 161 and 162, fingerprint generation devices 171 and 172, confirmation devices 181 and 182, and ML training devices 131 and 132, which all connect to network 130.

Figure 4:
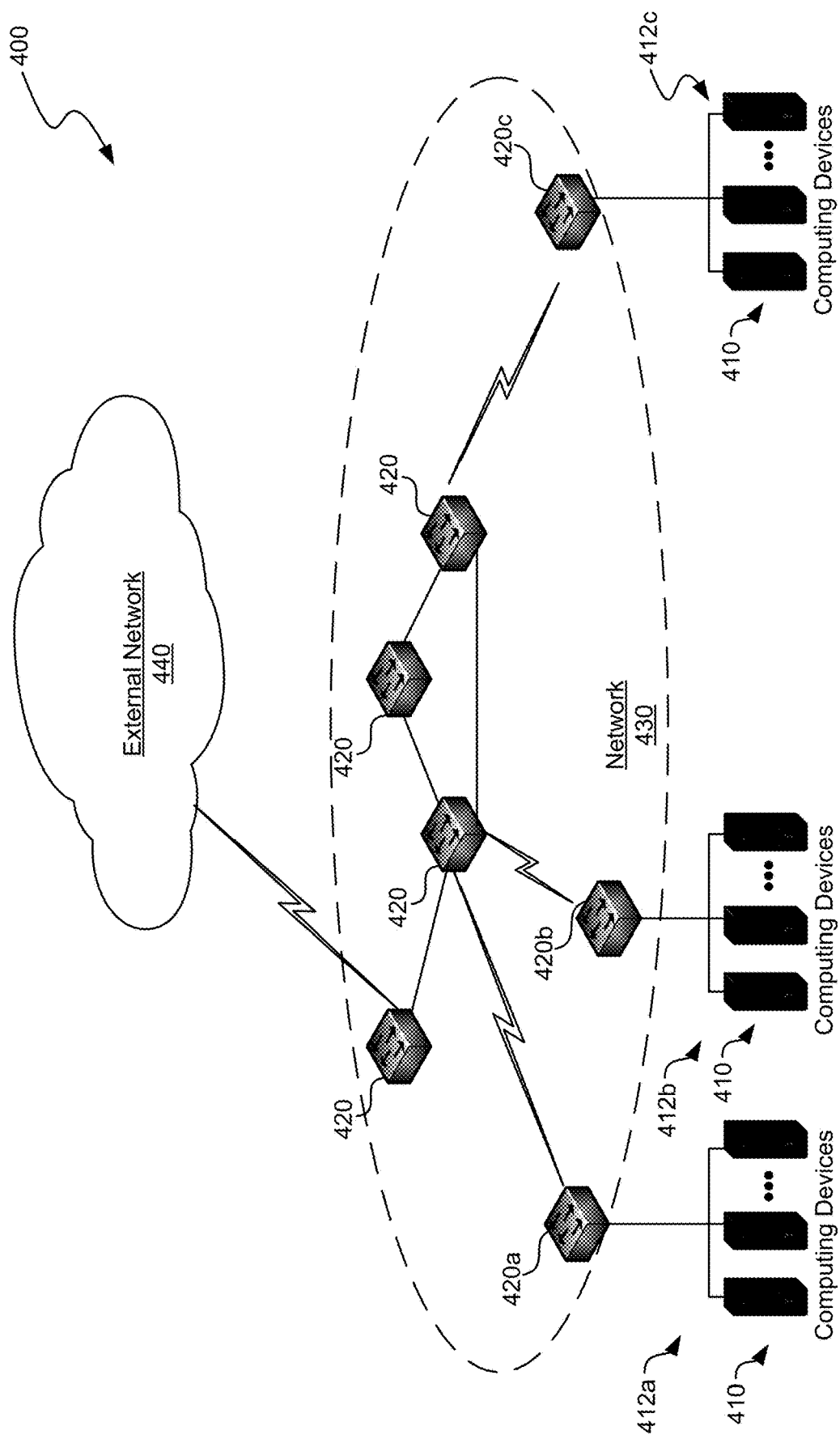
FIG. 4 is a block diagram illustrating one example of a suitable environment in which aspects of the technology may be employed.

Each of client devices 141 and 142, online service devices 151 and 152, pre-processing devices 161 and 162, fingerprint generation devices 171 and 172, confirmation devices 181 and 182, and ML training devices 131 and 132 include examples of computing device 400 of FIG. 4. Online service devices 151 and 152 are part of one or more distributed systems, pre-processing devices 161 and 162 are part of one or more distributed systems, fingerprint generation devices 171 and 172 are part of one or more distributed systems, confirmation devices 181 and 182 are part of one or more distributed systems, and ML training devices 131 and 132 are part of one or more distributed systems. ML training devices 131 and 132 are used to train one or more ML models, where the ML models are discussed in greater detail above and below.

Online service devices 151 and 152 provide one or more services on behalf of users. Among other things, the service includes providing access to various media documents. The online services include online meetings between users, where the online meetings may include a video component, and where the meeting may be recorded for later viewing. The online services allow documents to be presented during the online meeting, such that presented documents are visually displayed during the meeting. For instance, a presentation may be presented during the online meeting, where the presentation may include a number of slides. A user may use a client device (e.g., client device 141 or 142) to access online services provided by online service devices 151 and 152. Pre-processing devices 161 and 162 provide various pre-processing functions for users. The pre-processing includes extracting images from media documents.

Fingerprint generation devices 171 and 172 operate as follows in some examples. Fingerprint generation devices 171 and 172 are used to provide source fingerprints and target fingerprints from the extracted images. The source fingerprints are provided from extracted images by a source ML model, and the target fingerprints are provided from extracted images by a target ML model. The fingerprints are vectors of floating-point numbers.

ML training devices 131 and 132 operate as follows in some examples. Training of the source ML model and the target ML model is accomplished by ML training devices, such as ML training devices 131 and 132. The source ML model and the target machine leaning model each include a separate neural network, but the source ML model and the target ML model are trained in parallel. The two ML models are trained in parallel so that the distance between the source fingerprint and target fingerprint is a below a particular threshold if the source image is embedded within the target image, and above the particular threshold otherwise. If the distance between the source fingerprint and target fingerprint is below the particular threshold, the fingerprints are said to be similar.

In addition to generating the source fingerprints and the target fingerprints from the extracted images, fingerprint generation devices 171 and 172 are also used to find similar fingerprints among the source fingerprints and the target fingerprints. A nearest neighbor algorithm is used to find similar fingerprints. Similar fingerprints identify candidates for the source input image being embedded in the target input image.

Confirmation devices 181 and 182 operate as follows in some examples. Confirmation devices 181 and 182 determine, for each candidate, whether the source image is embedded in the target image. A confirmation ML model is used to make this determination. In some examples, the ML model used by confirmation devices 181 and 182 are trained by ML training devices, such as ML training devices 131 and 132 or other ML training devices. The training of the ML model used for confirmation devices 181 and 182 is entirely separate from the training of the ML models used for generating the fingerprints.

Network 130 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, and/or other communications links known to those skilled in the art. Furthermore, remote computers and other related electronic devices could be remotely connected to either LANs or WANs via a modem and temporary telephone link. Network 130 may include various other networks such as one or more networks using local network protocols such as 6LoWPAN, ZigBee, or the like. In essence, network 130 may include any suitable network-based communication method by which information may travel among client devices 141 and 142, online service devices 151 and 152, pre-processing devices 161 and 162, fingerprint generation devices 171 and 172, confirmation devices 181 and 182, and ML training devices 131 and 132. Although each device is shown connected as connected to network 130, that does not necessarily mean that each device communicates with each other device shown. In some examples, some devices shown only communicate with some other devices/services shown via one or more intermediary devices. Also, although network 130 is illustrated as one network, in some examples, network 130 may instead include multiple networks that may or may not be connected with each other, with some of the devices shown communicating with each other through one network of the multiple networks and other of the devices shown instead communicating with each other with a different network of the multiple networks.

System 100 may include more or less devices than illustrated in FIG. 1, which is shown by way of example only.

Figure 2:
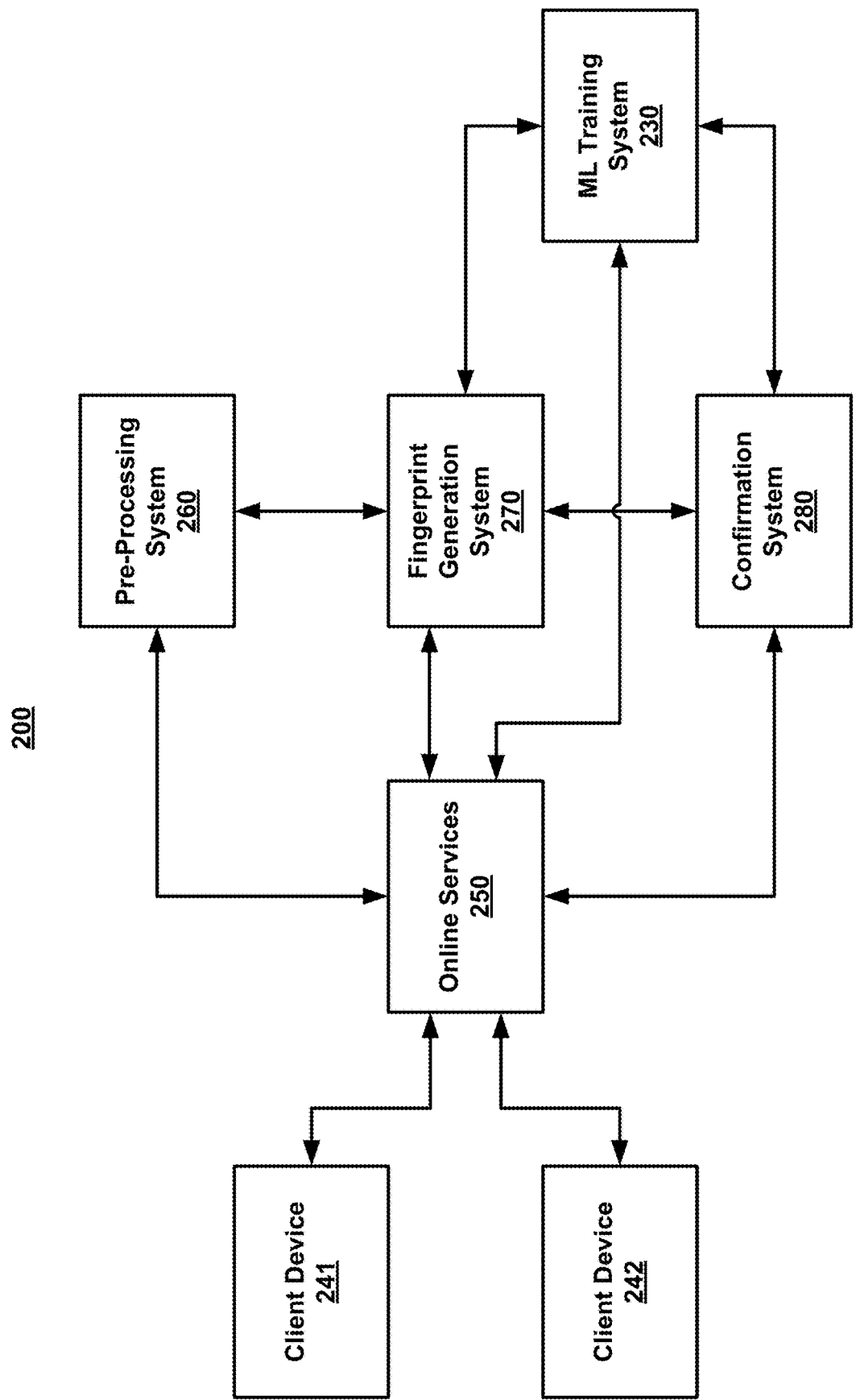
FIG. 2 is a block diagram illustrating an example of a system for identifying media documents embedded within other media documents.

FIG. 2 is a block diagram illustrating an example of a system (200). System 200 may be an example of system 100 of FIG. 1. System 200 is described as follows in accordance with some examples. System 200 includes client device 241, client device 242, online services 250, pre-processing system 260, fingerprint generation system 270, confirmation system 280, and ML training system 230. Online services 250, pre-processing system 260, fingerprint generation system 270, confirmation system 280, and ML training system 230 include one or more distributed systems.

Online service 250 provide one or more services on behalf of users. Among other things, the services provided by online service 250 include access to various media documents. The services provided by online service 250 may include online meetings between users, where the online meeting may include a video component, and where the online meeting may be recorded for later viewing. The online services allow documents to be presented during the online meeting, such that the documents are displayed during the online meeting. For instance, a presentation may be presented during the online meeting, where the presentation may include a number of slides. A user may use a client device (e.g., client device 241 or 242) to access services provided by online service 250.

System 200 may be used to automatically find media documents that are found within another media document. The relationship may be found in either direction. That is, system 200 may automatically find media documents that are embedded a particular media document and may automatically find media documents that contain a particular media document. The relationships determined by system 200 are asymmetric, in contrast to a standard image similarity search, which is symmetric. For example, in a standard image similarity search, if image A is similar to image B, then image B is similar to image A. However, in the "embedded within" type of similarity relationship that is determined by system 200, if image A is embedded within image B, then typically image B is not embedded within image A.

The media documents provided by online service 250 may further include any suitable media documents, such as video files, presentation files, slides, structured text documents, unstructured text documents, image files, or the like. Such structured and unstructured text documents may include, among other things, word processing documents, spreadsheets, fixed-document formats, text files, web page documents, or the like. A presentation document embedded within a video was discussed above. However, in various examples, system 200 may locate various combinations of media documents embedded within other media documents, such as a video within another video, a presentation inside of another presentation, an image inside of a presentation, any suitable type of structured or unstructured text document within a video, any suitable type of structured or unstructured text document within another structured or unstructured text document, or the like.

ML training system 230 is configured to train ML models, some of which may be related, and some of which may be completely unrelated. For instance, in some examples, ML training system 230 includes a first neural network that is trained in parallel with a second neural network to train two ML models in parallel—a source ML model and a target ML model. ML training system 230 may also include an entirely separate distributed system that is used to train a confirmation ML model that confirms whether an image is embedded within another image. More details of examples of the ML models trained by ML training system 230 are discussed above and below in conjunction with the processes that make use of the ML models.

Pre-processing system 260 operates as follows in some examples. Pre-processing system 260 receives input media documents for which it is desired to discover "embedded in" relationships among the media documents. For instance, it may be desired to find media documents that are embedded a particular media document, and/or to automatically find media documents that contain a particular media document. Pre-processing system 260 may extract images from each of the input media documents. In some examples, pre-processing system 260 may separate the pre-processing into two or more separate processes that are performed by separate distributed systems in order to achieve greater efficiency. In other examples, the pre-processing is not split up in this manner.

The input media documents include both "source" media documents and "target" media documents. System 200 determines which "source" media documents are embedded in a "target" media document. Accordingly, the target media documents are documents for which system 200 should determine whether the source media document is embedded in another media document. Source media documents are documents for which system 200 should determine whether any of the source media documents is embedded in the target media document. In various examples, some of the source media documents may also be target media documents, and in some examples, all of the media documents may be both source media documents and target media documents.

For instance, in some examples, it may be desired to determine whether any video files are embedded in another video file. In these examples, the video files are both source media documents and target media documents. In other examples, it may be desired to determine whether any presentations are embedded in any video files, but not to determine whether any video files are embedded in other media documents. In these examples, the video files are source media documents, but the video files are not target media documents.

The manner in which pre-processing system 260 extracts images from a media document depends on the type of media document from which images are being extracted. For instance, in the case of a presentation that is comprised of slides, each slide in the presentation is extracted as a separate image. In the case of a scrollable document, such as a word processing document, the extracted images include screenshots or the like from various points in the document.

The images extracted from a video file includes frames from the video file. A computer vision algorithm is used to extract frames from the video for which the context significantly changed in such a way that the frame may include a new document or a new portion of a document, such as a new presentation or a new slide from a presentation. Pre-processing system 260 performs extraction of images on new media documents when new media documents are provided to pre-processing system 260.

Fingerprint generation system 270 operates as follows in some examples. Fingerprint generation system 270 is used to generate fingerprints from the images extracted by pre-processing system 270. In some examples, the each of the fingerprints is a vector of floating-point numbers. In other examples, rather than being vectors of floating-points numbers, the fingerprints are instead different suitable mathematical structures, data structures, or the like. Fingerprint generation system 270 generates both source fingerprints and target fingerprints from the extracted images. Fingerprint generation system 270 generates the source fingerprints from the extracted source images using a source ML model that was trained by ML training system 230 and generates the target fingerprints from the extracted target images using a target ML model that was trained by ML training system 230. Fingerprint generation system 270 repeats the process when new extracted images are provided by pre-processing system 260 upon new media documents being provided to pre-processing system 260.

The source ML model and the target ML model used by fingerprint generation system 270 are generated by ML model training system 230 as follows in some examples. The source ML model and the target machine leaning model each include a separate neural network, but the source ML model and the target ML model are trained in parallel. In some examples, the two ML models are trained in parallel so that the $L_2$ distance between the source fingerprint and target fingerprint is a below a particular threshold if the source image is embedded within the target image, and above the particular threshold otherwise. If the distance between the source fingerprint and target fingerprint is a below the particular threshold, the fingerprints are said to be similar.

The particular threshold is defined by a loss function. More specifically, the source ML model and the target source ML model are trained, based on training data and a ground truth, to minimize the output of the following loss function, where d represents the $L_2$ distance between the target fingerprint and the source fingerprint: $1-1/(1+d^2)$ if the source image is embedded in the target image and $1/(1+d^2)$ otherwise. The $L_2$ distance d is defined as follows: $d=|F_1(A)-F_2(B)|^2$, where $F_1(A)$ is the target fingerprint vector and $F_2(B)$ is the source fingerprint vector. The loss function is a combined loss function that is used by the training of both the source ML model and the target ML model in the parallel training of the source ML model and the target ML model. While a particular loss function is discussed above according to one example, in other examples, other suitable loss functions may be used.

Training data and a ground truth for the training data are obtained. Additionally, setting up is performed for the model to be trained. Setting up the model includes providing a structure for the model. Additionally, a loss function is obtained for the model or models. A combined loss function is defined for the source ML model and the target ML model. The training of the source ML model and the target ML model uses supervised training in which the training data includes a number of images along with a ground truth that indicates, from among the images in the training data, which images are embedded within other images.

During the training process, each neural network attempts to minimize the loss function by modifying parameters and determining whether the modification achieved a better result based on the output of the loss function with the modification performed. In some examples, the training is performed within one particular desired media document context, such as slide presentations presented during online video meetings. In other examples, the training is general, with images embedded within other images in a variety of different media document contexts.

In some examples, fingerprint generation system 270 also includes one or more distributed systems that manage the storage of one or more metric space indexes that store the source fingerprints and the target fingerprints, as follows. The metric space indexes are each a type of search index that is designed to solve the nearest neighbor problem efficiently using a k-dimensional tree or other suitable method. The metric space indexes can be used to find the k nearest vectors inside the indexes. There is one metric space index that is used to store the source fingerprints and another separate metric space index that is used to store the target fingerprints.

Accordingly, a lookup may be performed using the metric space index to find the most similar candidates (with similarity defined between a source fingerprint and a target fingerprint). The most similar fingerprints are identified as candidates for the source input image from which the source fingerprint was obtained being embedded within the target input image from which the target fingerprint was obtained. In this way, the identified candidates are candidate media-document pairs including the source media document from which the source input image was extracted and the target media document from which the target input image was extracted, where the source media document is a candidate for being embedded within the target media document.

In some examples, confirmation system 280 operates as follows. The candidate images are provided to confirmation system 280. Confirmation system 280 confirms, for each of the candidates, whether the source input image from which the source fingerprint was obtained is embedded within the target input image from which the target fingerprint was determined. If the source input image is embedded within the target input image, then the source media document is embedded within the target media document. The confirmation performed by confirmation system 280 is accomplished via a confirmation ML model that confirms whether an image is embedded within another image.

Training of the confirmation ML model is performed by ML training system 230. The confirmation ML model receives as inputs the target input image from which the target fingerprint was obtained and the source input image from which the source fingerprint was obtained. The confirmation ML model outputs a confidence score that represents the confidence that the source input image is embedded within the target input image. If the confidence score exceeds a defined threshold, the confirmation ML model indicates that the source input image is embedded within the target input image.

In some examples, the confirmation process that is performed by confirmation system 280 could not be performed on all of the images extracted by pre-processing system 260 in a reasonable amount of time. Accordingly, instead, in some examples, fingerprint generation system 270 provides candidates, and confirmation system 280 performs the confirmation process on the corresponding candidate image pairs, rather than performing the confirmation process on all of the images extracted by pre-processing system 260. Some examples of system 200 do not include confirmation system 280. In these examples, the candidates are returned as outputs, where the recipients of the outputs may take perform confirmation on the candidates if desired.

In some examples, confirmation system 280 provides output results as follows. Confirmation system 280 sends the output results to online services 250, where the output results include an indication as to which media documents are embedded within other media documents. By sending the output results to online services 250, online services 250 may provide information about the output results to the users, as discussed in greater detail below. The output results are stored in a database for future reference. The database that stores the output results may be in confirmation system 280, fingerprint generation service 270, online services 250, or another suitable system. The relationships are stored as pairs that can be retrieved repeatedly and at a relatively low resource cost.

Online services 250 may act on the results in different ways in some examples. For instance, in some examples, shortly after an online meeting has been completed, online services 250 may add a link from the meeting recording to each document that was presented during the online meeting. For example, whenever a document is shown by online services 250, online services 250 may add a link to any video that presented the document. In some examples, whenever a search that includes documents is performed by online services 250, online services 250 includes, for each document in the search results, any video in which the document is embedded.

In some examples, the online service 250 provides the links automatically. In some examples, online service 250 automatically provides links between media documents determined to be similar based on a "embedded in" relationship in other suitable ways. In some examples, the relationship may be indicated in a manner other than a link in addition to or instead of providing a link, such as by providing an annotation of the relationship, or in another suitable way.

In some examples, when providing information about such connections between media documents, online services 250 may also provide information about the location in a media document in which the connection exists. Such location information may include, for example, the time in a video file or the slide of a presentation or the page of a document in which the media document is embedded within another document or in which the media document contains another document. The location information within a media document that has the relationship may be determined based on which image extracted from the media document has the relationship to an image extracted from another media document.

In some examples, online services 250, in the above examples, enforces security rules, privacy rules, and/or the like, so that a link is not provided if doing so would violate a security rule, privacy rule, and/or the like. For instance, in some examples, when online service 250 provides links as discussed above, a link is not provided to a user that does not have permission to view the target of the link.

Illustrative Processes

Figure 3:
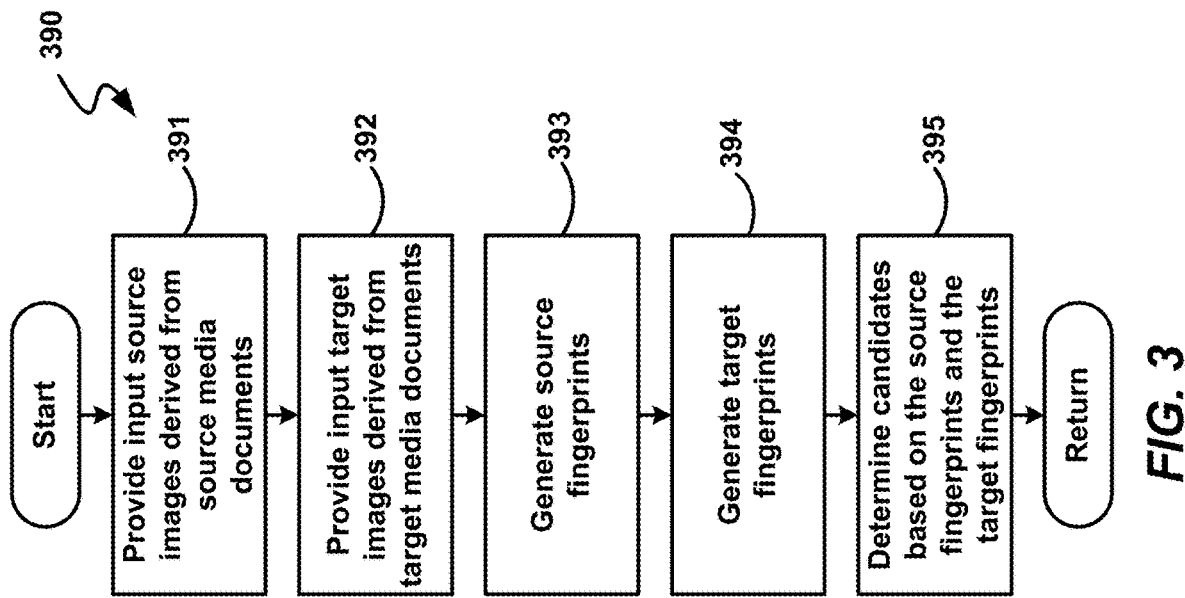
FIG. 3 is a flow diagram illustrating an example process for identifying media documents embedded within other media documents.

FIG. 3 a diagram illustrating an example dataflow for a process (390) for identifying media documents embedded within other media documents. In some examples, process 390 may be performed by an example of one of the fingerprint generation devices 171 or 172 of FIG. 1, by an example of fingerprint generation system 270 of FIG. 2, by an example of device 400 of FIG. 4, or the like. In some examples, process 390 proceeds as follows.

Step 391 occurs first. At step 391, source input images that are derived from a set of source media documents are obtained. As shown, step 392 occurs next. At step 392, target input images that are derived from a set of target media documents are obtained. As shown, step 393 occurs next. At step 393, source fingerprints from the source input images are generated using a source ML model. As shown, step 394 occurs next.

At step 394, target fingerprints from the target input images are generated using a target ML model. The source ML model includes a first neural network. The target ML model includes a second neural network that is different from the first neural network. The source ML model was trained in parallel with the target ML model such that the source ML model outputs a source fingerprint from a source input image and the target ML model outputs a target fingerprint from a target input image with a training objective that: a distance between the source fingerprint and the target fingerprint is less than a first threshold if the source input image is embedded within the target input image, and the distance between the source fingerprint and the target fingerprint is greater than the first threshold if the source image is absent from the target input image.

As shown, step 395 occurs next. At step 395, the source fingerprints and the target fingerprints are used to determine a set of candidate media-document pairs. Each candidate media-document pair of the set of candidate media-document pairs includes a candidate source media document from the source media documents and a candidate target media document from the target media documents such that the candidate source media document is a candidate for being embedded in the candidate target media document. The process may then advance to a return block, where other processing is resumed.

Illustrative Devices/Operating Environments

FIG. 4 is a diagram of environment 400 in which aspects of the technology may be practiced. As shown, environment 400 includes computing devices 410, as well as network nodes 420, connected via network 430. Even though particular components of environment 400 are shown in FIG. 4, in other examples, environment 400 can also include additional and/or different components. For example, in certain examples, the environment 400 can also include network storage devices, maintenance managers, and/or other suitable components (not shown). Computing devices 410 shown in FIG. 4 may be in various locations, including a local computer, on premise, in the cloud, or the like. For example, computer devices 410 may be on the client side, on the server side, or the like.

As shown in FIG. 4, network 430 can include one or more network nodes 420 that interconnect multiple computing devices 410, and connect computing devices 410 to external network 440, e.g., the Internet or an intranet. For example, network nodes 420 may include switches, routers, hubs, network controllers, or other network elements. In certain examples, computing devices 410 can be organized into racks, action zones, groups, sets, or other suitable divisions. For example, in the illustrated example, computing devices 410 are grouped into three host sets identified individually as first, second, and third host sets 412a-112c. In the illustrated example, each of host sets 412a-112c is operatively coupled to a corresponding network node 420a-120c, respectively, which are commonly referred to as "top-of-rack" or "TOR" network nodes. TOR network nodes 420a-120c can then be operatively coupled to additional network nodes 420 to form a computer network in a hierarchical, flat, mesh, or other suitable types of topology that allows communications between computing devices 410 and external network 440. In other examples, multiple host sets 412a-112c may share a single network node 420. Computing devices 410 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 410 may be individually configured to provide computing, storage, and/ or other suitable computing services.

In some examples, one or more of the computing devices 410 is a device that is configured to be at least part of a system for identifying media documents embedded within other media documents.

Illustrative Computing Device

Figure 5:
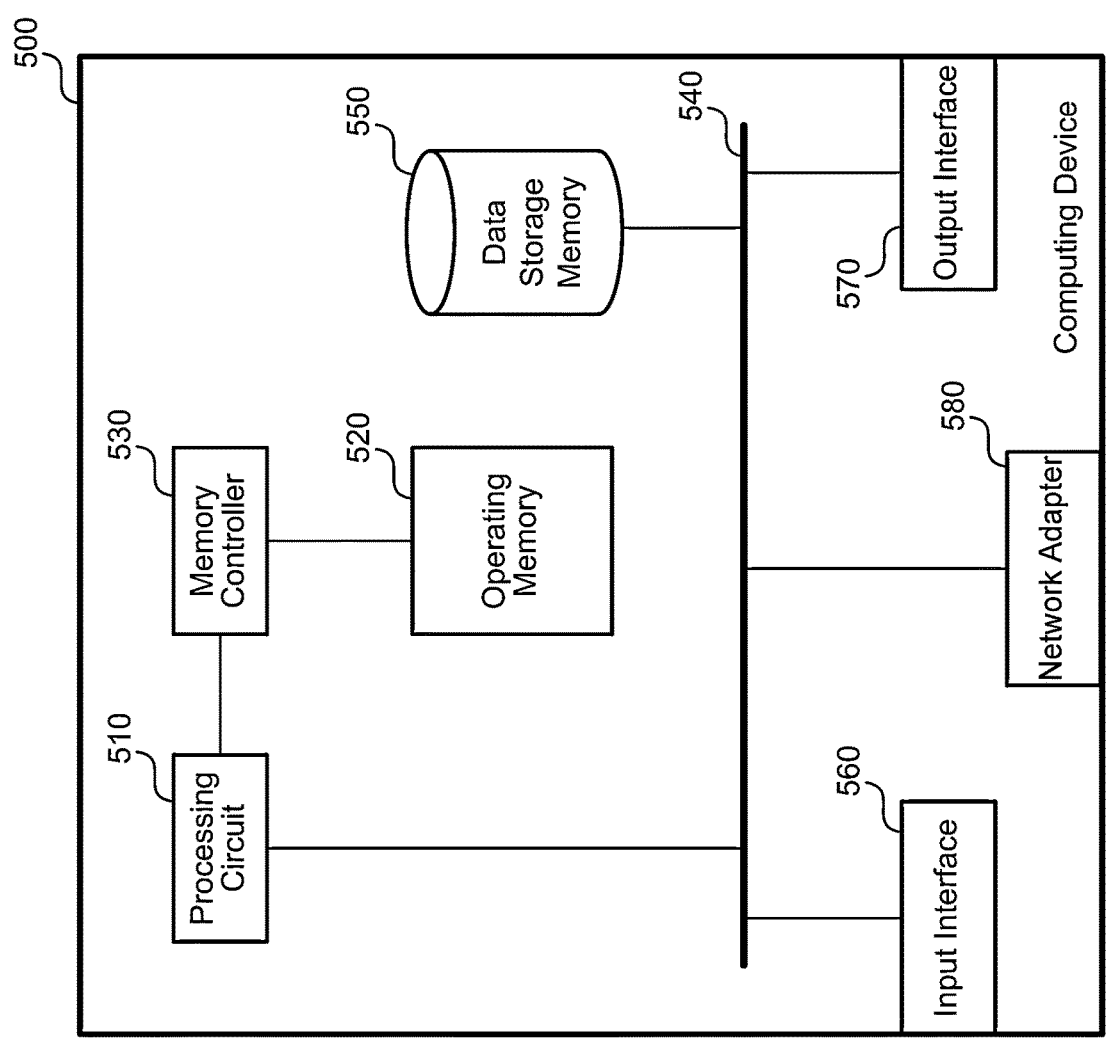
FIG. 5 is a block diagram illustrating one example of a suitable computing device, according to aspects of the disclosed technology.

FIG. 5 is a diagram illustrating one example of computing device 500 in which aspects of the technology may be practiced. Computing device 500 may be virtually any type of general- or specific-purpose computing device. For example, computing device 500 may be a user device such as a desktop computer, a laptop computer, a tablet computer, a display device, a camera, a printer, or a smartphone. Likewise, computing device 500 may also be a server device such as an application server computer, a virtual computing host computer, or a file server computer, e.g., computing device 500 may be an example of computing device 410 or network node 420 of FIG. 4. Likewise, computer device 500 may be an example any of the devices, a device within any of the distributed systems, illustrated in or referred to in any of the following figures, as discussed in greater detail below. As illustrated in FIG. 5, computing device 500 may include processing circuit 510, operating memory 520, memory controller 530, bus 540, data storage memory 550, input interface 560, output interface 570, and network adapter 580. Each of these afore-listed components of computing device 500 includes at least one hardware element.

Computing device 500 includes at least one processing circuit 510 configured to execute instructions, such as instructions for implementing the herein-described workloads, processes, and/or technology. Processing circuit 510 may include a microprocessor, a microcontroller, a graphics processor, a coprocessor, a field-programmable gate array, a programmable logic device, a signal processor, and/or any other circuit suitable for processing data. The aforementioned instructions, along with other data (e.g., datasets, metadata, operating system instructions, etc.), may be stored in operating memory 520 during run-time of computing device 500. Operating memory 520 may also include any of a variety of data storage devices/components, such as volatile memories, semi-volatile memories, random access memories, static memories, caches, buffers, and/or other media used to store run-time information. In one example, operating memory 520 does not retain information when computing device 500 is powered off. Rather, computing device 500 may be configured to transfer instructions from a non-volatile data storage component (e.g., data storage component 550) to operating memory 520 as part of a booting or other loading process. In some examples, other forms of execution may be employed, such as execution directly from data storage component 550, e.g., eXecute In Place (XIP).

Operating memory 520 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), and/or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 510 via memory controller 530 in channels. One example of computing device 500 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 520 specifically does not include or encompass communications media, any communications medium, or any signals per se.

Memory controller 530 is configured to interface processing circuit 510 to operating memory 520. For example, memory controller 530 may be configured to interface commands, addresses, and data between operating memory 520 and processing circuit 510. Memory controller 530 may also be configured to abstract or otherwise manage certain aspects of memory management from or for processing circuit 510. Although memory controller 530 is illustrated as single memory controller separate from processing circuit 510, in other examples, multiple memory controllers may be employed, memory controller(s) may be integrated with operating memory 520, and/or the like. Further, memory controller(s) may be integrated into processing circuit 510. These and other variations are possible.

In computing device 500, data storage memory 550, input interface 560, output interface 570, and network adapter 580 are interfaced to processing circuit 510 by bus 540. Although FIG. 5 illustrates bus 540 as a single passive bus, other configurations, such as a collection of buses, a collection of point-to-point links, an input/output controller, a bridge, other interface circuitry, and/or any collection thereof may also be suitably employed for interfacing data storage memory 550, input interface 560, output interface 570, and/or network adapter 580 to processing circuit 510.

In computing device 500, data storage memory 550 is employed for long-term non-volatile data storage. Data storage memory 550 may include any of a variety of non-volatile data storage devices/components, such as non-volatile memories, disks, disk drives, hard drives, solid-state drives, and/or any other media that can be used for the non-volatile storage of information. However, data storage memory 550 specifically does not include or encompass communications media, any communications medium, or any signals per se. In contrast to operating memory 520, data storage memory 550 is employed by computing device 500 for non-volatile long-term data storage, instead of for run-time data storage.

Also, computing device 500 may include or be coupled to any type of processor-readable media such as processor-readable storage media (e.g., operating memory 520 and data storage memory 550) and communication media (e.g., communication signals and radio waves). While the term processor-readable storage media includes operating memory 520 and data storage memory 550, the term "processor-readable storage media," throughout the specification and the claims, whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 500 also includes input interface 560, which may be configured to enable computing device 500 to receive input from users or from other devices. In addition, computing device 500 includes output interface 570, which may be configured to provide output from computing device 500. In one example, output interface 570 includes a frame buffer, graphics processor, graphics processor or accelerator, and is configured to render displays for presentation on a separate visual display device (such as a monitor, projector, virtual computing client computer, etc.). In another example, output interface 570 includes a visual display device and is configured to render and present displays for viewing. In yet another example, input interface 560 and/or output interface 570 may include a universal asynchronous receiver/transmitter (UART), a Serial Peripheral Interface (SPI), Inter-Integrated Circuit (I2C), a General-purpose input/output (GPIO), and/or the like. Moreover, input interface 560 and/or output interface 570 may include or be interfaced to any number or type of peripherals.

In the illustrated example, computing device 500 is configured to communicate with other computing devices or entities via network adapter 580. Network adapter 580 may include a wired network adapter, e.g., an Ethernet adapter, a Token Ring adapter, or a Digital Subscriber Line (DSL) adapter. Network adapter 580 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 500 is illustrated with certain components configured in a particular arrangement, these components and arrangements are merely one example of a computing device in which the technology may be employed. In other examples, data storage memory 550, input interface 560, output interface 570, or network adapter 580 may be directly coupled to processing circuit 510 or be coupled to processing circuit 510 via an input/output controller, a bridge, or other interface circuitry. Other variations of the technology are possible.

Some examples of computing device 500 include at least one memory (e.g., operating memory 520) having processor-executable code stored therein, and at least one processor (e.g., processing unit 510) that is adapted to execute the processor-executable code, wherein the processor-executable code includes processor-executable instructions that, in response to execution, enables computing device 500 to perform actions, where the actions may include, in some examples, actions for one or more processes described herein, such as the process shown in FIG. 3, as discussed in greater detail above.

The above description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud but are devices that serve as an entry point into enterprise or service provider core networks.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
 a device including memory having processor-executable code stored therein, and a processor that is adapted to execute the processor-executable code, wherein the processor-executable code includes processor-executable instructions that, in response to execution, enable the device to perform actions, including:
   obtaining source input images that are derived from a set of source media documents;
   obtaining target input images that are derived from a set of target media documents;
   generating source fingerprints from the source input images using a source machine-learning model;
   generating target fingerprints from the target input images using a target machine-learning model, wherein:
     the source machine-learning model includes a first neural network, the target machine-learning model includes a second neural network that is different from the first neural network, and the source machine-learning model was trained in parallel with the target machine-learning model such that the source machine-learning model outputs a source fingerprint from a source input image and the target machine-learning model outputs a target fingerprint from a target input image with a training objective that:

a distance between the source fingerprint and the target fingerprint is less than a first threshold if the source input image is embedded within the target input image, and the distance between the source fingerprint and the target fingerprint is greater than the first threshold if the source input image is absent from the target input image;

using the source fingerprints and the target fingerprints to determine a set of candidate media-document pairs, wherein each candidate media-document pair of the set of candidate media-document pairs includes a candidate source media document from the set of source media documents and a candidate target media document from the set of target media documents such that the candidate source media document is a candidate for being embedded in the candidate target media document; and using a confirmation machine-learning model to determine, for candidate media-document pairs in the set of candidate media-document pairs, a confidence score that the candidate source media document of the set of candidate media-document pairs is embedded in the candidate target media document of the set of candidate media-document pairs.

2. The apparatus of claim 1, wherein a source media documents of the set of source media documents include at least one of video files, presentation files, slides, structured text documents, unstructured text documents, or image files.

3. The apparatus of claim 1, wherein each source fingerprints and each of the target fingerprints is a vector of floating-point numbers.

4. The apparatus of claim 1, wherein the training objective that the distance between the source fingerprint and the target fingerprint is less than the first threshold if the source input image is embedded within the target input image, and that the distance between the source fingerprint and the target fingerprint is greater than the first threshold if the source input image is absent from the target input image, includes a training objective of minimizing an output result of a combined loss function of the source fingerprints and the target fingerprints.

5. The apparatus of claim 4, wherein a loss function is $1-1/(1+d^2)$ if the source input image is embedded in the target input image and $1/(1+d^2)$ otherwise, wherein d is an $L_2$ distance between $F_1(A)$ and $F_2(B)$, wherein $d=|F_1(A)-F_2(B)|^2$, and wherein $F_1(A)$ is the target fingerprint and $F_2(B)$ is the source fingerprint.

6. The apparatus of claim 1, the actions further including: generating the source input images by extracting the source input images from the set of source media documents and generating the target input images by extracting the target input images from the set of source media documents.

7. The apparatus of claim 6, wherein the set of target media documents includes a first video, and wherein extracting the target input images from the set of target media documents includes using a computer vision algorithm to extract frames from a video file in which it is determined, based on the computer vision algorithm, that a significant context change has occurred.

8. The apparatus of claim 1, the actions further including: storing the source fingerprints in a source metric space index and storing the target fingerprints in a target metric space index.

9. The apparatus of claim 8, wherein determining the set of candidate media-document pairs includes using the source metric space index and the target metric space index to determine nearest fingerprints using a nearest neighbor algorithm.

10. A method, comprising:
providing training data that includes images to be used in training;
setting up a source machine-learning model such that the source machine-learning model generates a source fingerprint from a source input image;
setting up a target machine-learning model such that the target machine-learning model generates a target fingerprint from a target input image;
defining a combined loss function that is associated with the source machine-learning model and the target machine-learning model, such that the combined loss function is associated whether the source input image is embedded within the target input image; and
in parallel, executing training of the source machine-learning model and the target machine-learning model based on the training data and the combined loss function;
wherein the combined loss function is $1-1/(1+d^2)$ if the source input image is embedded in the target input image and $1/(1+d^2)$ otherwise, wherein d is an $L_2$ distance between $F_1(A)$ and $F_2(B)$, wherein $d=|F_1(A)-F_2(B)|^2$ and wherein $F_1(A)$ is the target fingerprint and $F_2(B)$ is the source fingerprint.

11. The method of claim 10, wherein the source machine-learning model includes a first neural network, and the target machine-learning model includes a second neural network that is different from the first neural network.

12. The method of claim 10, wherein setting up the source machine-learning model is performed such that the source fingerprint is a vector of floating-point numbers, and wherein setting up the target machine-learning model is performed such that the target fingerprint is a vector of floating-point numbers.

13. The method of claim 10, further comprising: providing a ground truth that indicates which images in the training data are embedded within other documents in the training data, wherein executing the training is further based on the ground truth.

14. A processor-readable storage medium, having stored thereon processor-executable code that, upon execution by a processor, enables actions, comprising:
via a source machine-learning model, generating source fingerprints from source input images, wherein the source input images are derived from source media documents;
via a target machine-learning model, generating target fingerprints from target input images, wherein;
the target input images are derived from target media documents,
the source machine-learning model includes a first neural network,
the target machine-learning model includes a second neural network that is different from the first neural network, and the source machine-learning model was trained in parallel with the target machine-learning model such that the source machine-learning model outputs a source fingerprint from a source input image and the target machine-learning model outputs a target fingerprint from a target input image with a training objective that:
  a distance between the source fingerprint and the target fingerprint is less than a first threshold if the source input image is embedded within the target input image, and
  the distance between the source fingerprint and the target fingerprint is greater than the first threshold if the source input image is absent from the target input image; and
determining a set of candidate media-document pairs based on the source fingerprints and the target fingerprints, wherein each candidate media-document pair of the set of candidate media-document pairs includes a candidate source media document from among the source media documents and a candidate target media document from the target media documents such that the candidate source media document is a candidate for being embedded in the candidate target media document; and
using a confirmation machine-learning model to determine, for candidate media-document pairs in the set of candidate media-document pairs, a confidence score that the candidate source media document of the set of candidate media-document pairs is embedded in the candidate target media document of the set of candidate media-document pairs.

15. The processor-readable storage medium of claim 14, the actions further comprising: generating the source input images by extracting the source input images from the source media documents and generating the target input images by extracting the target input images from the source media documents.

16. The processor-readable storage medium of claim 14, the actions further comprising: storing the source fingerprints in a source metric space index and storing the target fingerprints in a target metric space index.

17. The processor-readable storage medium of claim 16, wherein determining the set of candidate media-document pairs includes using the source metric space index and the target metric space index to determine nearest fingerprints using a nearest neighbor algorithm.

* * * * *